(No Model.)
M. WHELESS.
INSULATED BRAKE.
No. 441,215. Patented Nov. 25, 1890.
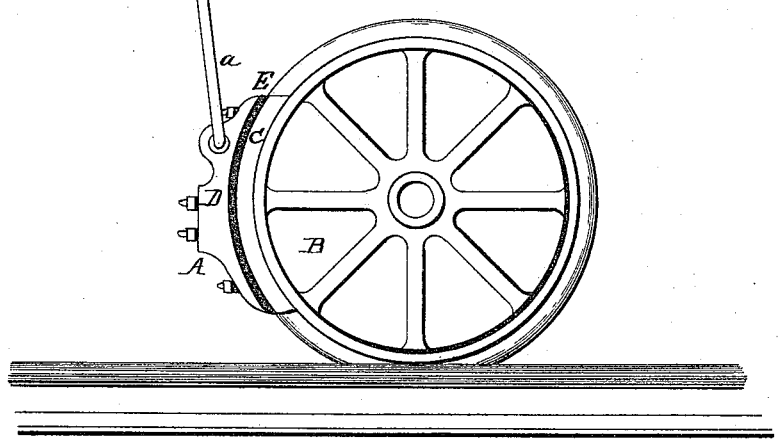
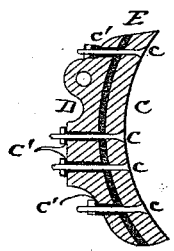
Witnesses
M. E. Courll
Thos. Houghton
Inventor
Malone Wheless,
per W. H. Singleton,
Atty.

UNITED STATES PATENT OFFICE.

MALONE WHELESS, OF NASHVILLE, TENNESSEE, ASSIGNOR TO THE WHELESS ELECTRIC RAILWAY COMPANY, OF ALEXANDRIA, VIRGINIA.

INSULATED BRAKE.

SPECIFICATION forming part of Letters Patent No. 441,215, dated November 25, 1890.

Application filed July 21, 1890. Serial No. 359,385. (No model.)

*To all whom it may concern:*

Be it known that I, MALONE WHELESS, a citizen of the United States, residing at Nashville, in the county of Davidson and State of Tennessee, have invented certain new and useful Improvements in Insulated Brakes for Electric Railways; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 represents the device in use. Fig. 2 is a section of the device.

This invention relates to an improved brake for electric railways; and it consists, broadly, in providing the car with a brake having means of insulation, so that the shoe or rubbing part is electrically insulated from the beam.

In the annexed drawings, the letter A indicates the brake, and B the wheel of the car, the brake having the ordinary hanger $a$.

The brake consists of the shoe C, the head D, and an interposed insulator E. The parts are held together by bolts $c$, passing through them. In the head D these bolts are surrounded by insulating-thimbles $c'$.

This brake is designed to be used upon a system wherein the wheels are utilized as part of an electric circuit, and hence it is desirable that the current shall not be shunted through a brake.

Having thus described my invention, what I claim is—

1. A railway-car brake in combination with the brake-beam, the rubbing part of the brake being electrically insulated from the beam, as set forth.

2. A car-brake consisting of a head and shoe and an interposed insulator, as set forth.

In testimony whereof I affix my signature in presence of two witnesses.

MALONE WHELESS.

Witnesses:
J. SHERMAN PATRICK,
GRAHAM L. GORDON.